United States Patent [19]

Olgren

[11] Patent Number: 4,990,021
[45] Date of Patent: Feb. 5, 1991

[54] DETENT CONNECTION

[75] Inventor: Leland N. Olgren, Saginaw, Mich.

[73] Assignee: General Motors Corporation, Detroit, Mich.

[21] Appl. No.: 516,850

[22] Filed: Apr. 30, 1990

[51] Int. Cl.$^5$ ............................................. F16D 1/00
[52] U.S. Cl. ...................................... 403/24; 403/355; 403/379; 74/493
[58] Field of Search ............... 403/355, 357, 378, 379, 403/326, 24; 285/318; 411/348, 372, 431; 74/493

[56] References Cited

U.S. PATENT DOCUMENTS 2,757,942  8/1956  Eberhardt .................. 403/326 X
3,421,783  1/1969  Sakai ............................ 403/327

FOREIGN PATENT DOCUMENTS 452682  12/1974  U.S.S.R. ..................... 403/326
895764   5/1962  United Kingdom ........ 403/355

Primary Examiner—Andrew V. Kundrat
Attorney, Agent, or Firm—Saul Schwartz

[57] ABSTRACT

A detent connection between a hidden release lever of a tilt-adjustable automotive steering column and an exposed hand lever of the steering column, the connection including a D-shaped socket in a tab on the release lever and a D-shaped plug-end on the hand lever. The flat portions of the D-shaped socket and plug-end face each other and each has a trough therein extending the full length of the flat portion and facing the trough in the other flat portions. The facing troughs define a detent tunnel in which a cylindrical coil spring is disposed in radial compression. The spring engages the troughs along the full lengths thereof to torsional and lonitudinal rigidity.

5 Claims, 1 Drawing Sheet

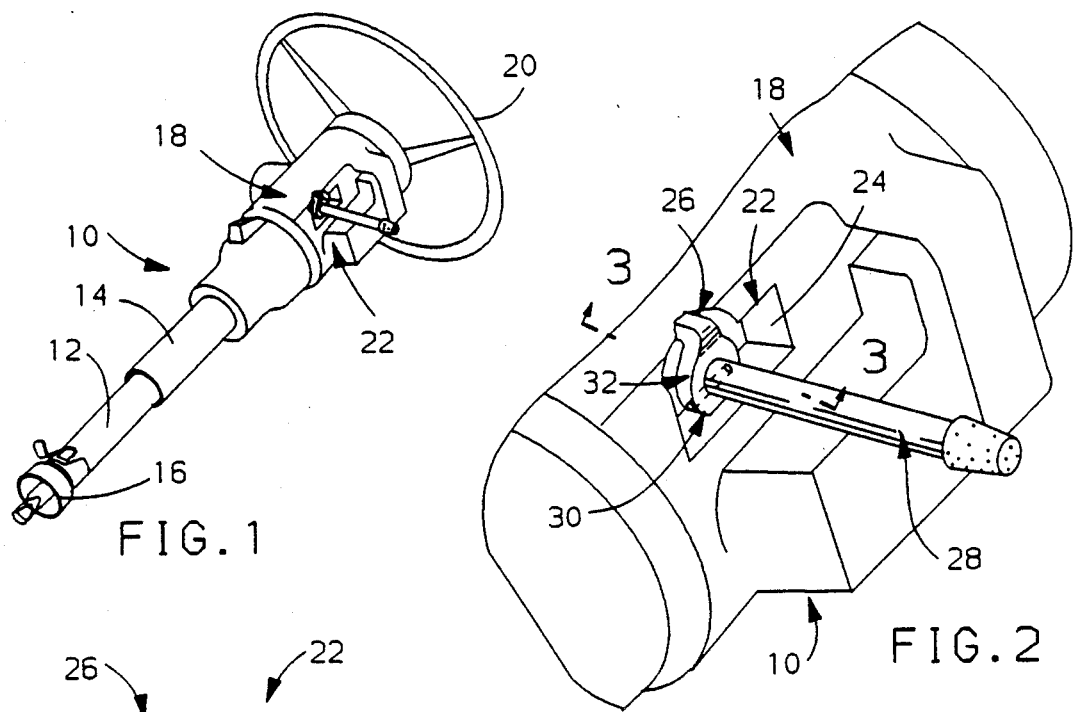
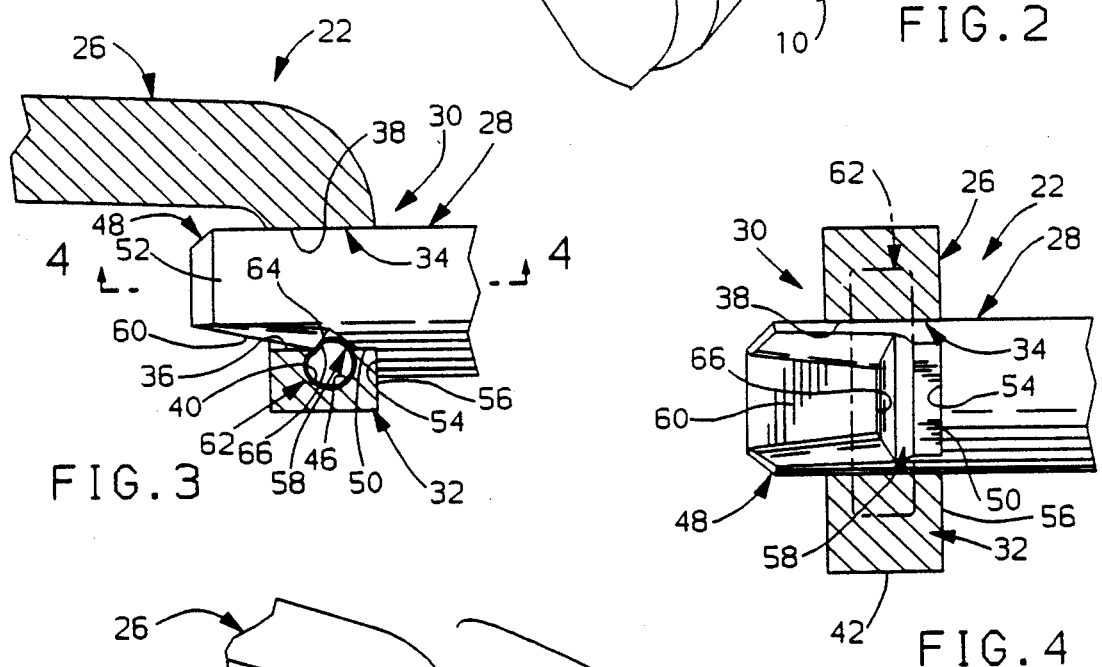
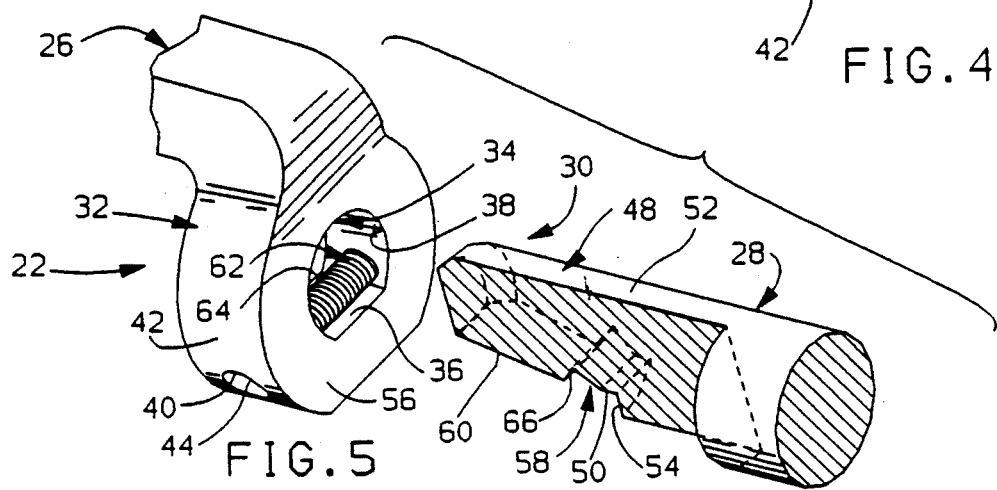

4,990,021

DETENT CONNECTION

Field of the Invention

This invention relates to a torsionally rigid detent connection between a non-exposed release lever in a tilt-adjustable automobile steering column and an exposed hand lever of the steering column.

BACKGROUND OF THE INVENTION

In common tilt-adjustable automobile steering columns, a tilt-housing rotatably supporting a steering wheel is, in turn, supported on a stationary mast jacket of the column for up and down pivotal movement so a driver can adjust the steering wheel to a personally comfortable attitude. Typically, the adjusted position of the steering wheel is captured by notched lock shoes on the tilt-housing engaging stationary pins on the mast jacket. A release lever hidden from view inside the tilt-housing moves the lock shoes to release the stationary pins when the release lever is pivoted by a hand lever exposed to the driver outside the tilt-housing. For ease of operation, durability and dependability, the hand lever and release lever must be rigid axially and torsionally. For assembly and field service, however, the hand lever and release lever must be separable. To that end, hand levers have been provided with threaded ends which screw into threaded sockets in the release levers. Also, a plug-in quarter turn attachment between a release lever and a hand lever is described in U.S. Pat. No. 4832524, issued May 23, 1989 to the inventor of this invention and assigned to the assignee of this invention. A connection according to this invention is an alternative connection between a release lever and a hand lever in tilt-adjustable automobile steering columns.

SUMMARY OF THE INVENTION

This invention is a new and improved connection between a hidden release lever of a tilt-adjustable automobile steering column and an exposed hand lever of the steering column. The connection according to this invention includes a socket in the release lever and a plug-end on the hand lever, each of the socket and the plug-end having a flat portion facing a corresponding flat portion on the other and each flat portion having a trough extending the length thereof. The troughs in the flat portions face each other and define a detent tunnel in which is disposed an elongated, resilient detent element which prevents axial dislodgment of the plug-end from the socket and engages each of the troughs along substantially their full lengths for torsional rigidity. A ramp on the plug-end compresses the resilient detent element for insertion of the plug-end into the socket. In a preferred embodiment of the invention, the resilient detent element is a cylindrical coil spring.

BRIEF DESCRIPTION OF THE DRAWING

FIG. 1 is a fragmentary perspective view of a tilt-adjustable automotive steering column having a hidden release lever joined to an exposed hand lever by a connection according to this invention;

FIG. 2 is an enlarged, partially broken-away view of a portion of FIG. 1;

FIG. 3 is an enlarged sectional view taken generally along the plane indicated by lines 3—3 in FIG. 2;

FIG. 4 is a sectional view taken generally along the plane indicated by lines 4—4 in FIG. 3; and FIG. 5 is an exploded perspective view of the connection according to this invention.

DESCRIPTION OF A PREFERRED EMBODIMENT

Referring to FIG. 1, a tilt-adjustable automobile steering column 10 includes a tubular lower mast jacket 12, a tubular upper mast jacket 14 telescoped over the lower mast jacket, and a steering shaft 16 rotatably supported on the mast jackets. The upper mast jacket is normally rigidly attached to a structural part of a vehicle and defines a stationary mounting for a tilt-housing 18 attached to the upper end of the upper mast jacket for up and down pivotal movement. An extension, not shown, is connected to the steering shaft 16 through a universal joint and is rotatably supported on the tilt-housing 18. A steering wheel 20 is attached to the extension. A representative tilt-adjustable steering column is described in U.S. Pat. No. 4543848, issued Oct. 1, 1985 to Howard Beauch and assigned to the assignee of this invention.

Adjusted positions of the tilt-housing 18 are captured by notched lock shoes of a tilt-lock, not shown, on the tilt-housing engaging rigid pins on the upper mast jacket. When the lock shoes are moved to release the pins, the tilt-housing is pivotable up and down to vary the position of the steering wheel. A lever assembly 22, FIGS. 1–3, projecting through a slot 24 in the tilt-housing actuates the lock shoes to release the stationary pins and includes a release lever 26 hidden inside and pivotally attached at one end to the tilt-housing 18 and a substantially fully exposed hand lever 28 for an operator. A representative tilt-lock is described in the aforesaid U.S. Pat. No. 4543848. The hand lever 28 and the release lever 26 are attached by a connection 30 according to this invention.

Referring to FIGS. 2–5, the connection 30 includes an integral tab 32 on the outboard end of the release lever perpendicular to the adjacent portion of the lever. The tab 32 has a D-shaped hole or socket 34 therein with a flat portion 36, FIGS. 3 and 5, and a contiguous cylindrical portion 38. A passage 40 through the tab 32 intersects an outside wall 42 of the latter at both ends, only a single end 44 being shown in FIG. 5. The longitudinal centerline of the passage 40 is below the plane of the flat portion 36 of the socket. The passage 40 partially intersects the socket 34 and defines an open trough 46 in the flat portion extending the full length of the flat portion.

The hand lever 28 is a cylindrical rod the diameter of which corresponds to the diameter of the socket 34. The inboard end of the hand lever 28 defines a plug-end 48 of the connection 30 adapted for close fit in the socket 34. The plug-end 48 includes a flat portion 50 corresponding to the flat portion 36 of the socket 34 and a cylindrical portion 52 corresponding to the cylindrical portion of the socket. When the plug-end is lodged in the socket the flat portions 36,50 face each other. A shoulder 54 on the hand lever defines an inboard end of the flat portion 50 and engages a side 56 of the tab 32 to limit penetration of the plug-end 48 in the socket 34.

A V-shaped trough 58 in the flat portion 50 on the plug-end extends the full length of the flat portion. The relative separation between the longitudinal centerline of the trough 58 and the shoulder 54 is coordinated with the relative separation between the longitudinal centerline of the passage 40 and the side 56 of tab 32 to assure that the troughs 46,58 face each other when the plug-end 48 is inserted in the socket to the depth of the shoulder 54. The facing troughs 46,58 cooperate in defining a detent tunnel extending across the flat portions 36,50 of the socket and the plug-end, respectively. An inclined ramp 60 on the plug-end 48 extends longitudinally from the end of the plug-end to the trough 58.

As best seen in FIGS. 3–5, the connection 30 further includes a detent element in the form of a cylindrical coil spring 62 the outside diameter of which corresponds to the diameter of the passage 40 in the tab 32. The spring 62 is longer than the flat portions 36,50 of the socket and plug-end, respectively, and when centered lengthwise in the passage 40 fills the detent tunnel between the facing troughs 46,58. A segment 64 of the spring 62 above the plane of the flat portion 36 of the socket defines a resilient, elongated abutment or detent on the tab 32 preventing longitudinal dislodgment of the plug-end 48 from the socket 34.

The spring 62 is an important feature of this invention and performs several functions. For example, the sides of the trough 58 in the flat portion 50 of the plug-end compress the spring 62 radially along the full length of the detent tunnel between the troughs. Accordingly, radial clearance between the outside of the plug-end and the socket is eliminated and the connection is torsionally rigid. In addition, the spring 62 presses primarily against an outboard flank 66 of the trough 58 in the plug-end to forcefully bias the shoulder 54 on the plug-end against the side 56 of the tab 32 so that the connection 30 is rigid in the longitudinal direction of the lever assembly 22.

The spring 62 is retained in the passage 40 by staking the open ends of the passage. When tension is applied to the lever assembly 22 above a predetermined magnitude, the outboard flank 66 of the trough 58 in the plug-end depresses the coils of the spring 62 into the trough 46 in the flat portion 36 of the socket 34 so that the plug-end 48 can be withdrawn from the socket 34. Conversely, during assembly, the inclined ramp 60 on the plug-end engages the exposed segment 64 of spring 62 and depresses the coils of the spring into the trough in the flat portion 36 of the socket to permit full insertion of the plug-end in the socket.

The embodiments of the invention in which an exclusive property or privilege is claimed are defined as follows:

1. In a tilt-adjustable automotive steering column, a connection between a hidden release lever and an exposed hand lever comprising:
   means defining a socket in said hidden release lever having a first flat portion,
   means defining a plug-end on said exposed hand lever shaped for insertion into said socket and including a second flat portion facing said first flat portion when said plug-end is inserted into said socket,
   means defining a first trough in said first flat portion extending the full length thereof,
   means defining a second trough in said second flat portion extending the full length thereof and facing said first trough when said plug-end is inserted into said socket and cooperating with said first trough in defining a detent tunnel,
   an elongated resilient detent element disposed in radial compression in said detent tunnel and extending the full lengths of said first and said second flat portions, and
   means attaching said detent element to one of said hidden release lever and said exposed hand lever.

2. The connection recited in claim 1 wherein said elongated resilient detent element is a cylindrical coil spring.

3. The connection recited in claim 2 wherein said coil spring is attached to said hidden release lever and a ramp is defined on said exposed hand lever for compressing said spring radially during insertion of said plug-end into said socket.

4. The connection recited in claim 3, wherein said detent tunnel intersects an outside wall of said hidden release lever to define at said intersection an open end of said detent tunnel through which said cylindrical coil spring is installed in said detent tunnel.

5. The connection recited in claim 4 wherein said open end of said detent tunnel is staked to prevent dislodgment of said cylindrical coil spring from said detent tunnel through said open end.

* * * * *